US012614076B2

(12) United States Patent
Jeon

(10) Patent No.: US 12,614,076 B2
(45) Date of Patent: Apr. 28, 2026

(54) NEURAL NETWORK OPTIMIZATION DEVICE FOR EDGE DEVICE MEETING ON-DEMAND INSTRUCTION AND METHOD USING THE SAME

(71) Applicant: Mobilint, Inc., Seoul (KR)

(72) Inventor: Haeryong Jeon, Seongnam-si (KR)

(73) Assignee: Mobilint, Inc., Seoul (KR)

( * ) Notice: Subject to any disclaimer, the term of this patent is extended or adjusted under 35 U.S.C. 154(b) by 0 days.

(21) Appl. No.: 18/786,758

(22) Filed: Jul. 29, 2024

(65) Prior Publication Data

US 2024/0386276 A1     Nov. 21, 2024

Related U.S. Application Data

(63) Continuation of application No. PCT/KR2022/021348, filed on Dec. 27, 2022.

(30) Foreign Application Priority Data

Dec. 12, 2022     (KR) ........................ 10-2022-0172462

(51) Int. Cl.
*G06N 3/082* (2023.01)
(52) U.S. Cl.
CPC .................................... *G06N 3/082* (2013.01)
(58) Field of Classification Search
None
See application file for complete search history.

(56) References Cited

U.S. PATENT DOCUMENTS 10,685,295 B1 * 6/2020 Ross ...................... G06N 20/00
11,443,162 B2     9/2022 Yang et al.
(Continued)

FOREIGN PATENT DOCUMENTS

KR     10-2019-0136431 A     12/2019
KR     10-2020-0084099 A     7/2020
(Continued)

OTHER PUBLICATIONS

International Search Report issued in PCT/KR2022/021348; mailed Aug. 23, 2023.
(Continued)

*Primary Examiner* — Abdullah Al Kawsar
*Assistant Examiner* — Asher H. Jablon
(74) *Attorney, Agent, or Firm* — Studebaker Brackett PLLC

(57) ABSTRACT

Disclosed is a neural network optimizing method performed by a device including performing a computation on an input value with a basic resource of a first neural network based on a customer-requested instruction for the basic resource used for computation execution of the first neural network, checking computational performance including a computational processing speed, a power consumption amount, and a chip area according to the computation execution of the first neural network, adjusting at least one of the basic resource based on the checked computational performance, and re-performing the computation on the input value based on the customer-requested instruction with a resource of the second neural network after changing to an environment of a second neural network by adjusting the at least one of the basic resource.

3 Claims, 5 Drawing Sheets

(56)                References Cited

U.S. PATENT DOCUMENTS

| | | | |
|---|---|---|---|
| 2011/0320751 A1* | 12/2011 | Wang | G06F 13/1684 |
| | | | 711/E12.079 |
| 2012/0226809 A1* | 9/2012 | Yang | H04L 69/14 |
| | | | 709/226 |
| 2016/0357610 A1* | 12/2016 | Bartfai-Walcott | G06F 9/5072 |
| 2018/0285726 A1 | 10/2018 | Baum et al. | |
| 2020/0210836 A1 | 7/2020 | Kim et al. | |
| 2021/0056378 A1 | 2/2021 | Yang et al. | |
| 2021/0089611 A1* | 3/2021 | Jiao | G06N 3/045 |
| 2021/0224275 A1 | 7/2021 | Maheshwari et al. | |
| 2022/0147801 A1 | 5/2022 | Davidi et al. | |
| 2022/0188569 A1 | 6/2022 | Ananthanarayanan et al. | |
| 2022/0414425 A1 | 12/2022 | Yang et al. | |

FOREIGN PATENT DOCUMENTS

| | | |
|---|---|---|
| KR | 10-2247629 B1 | 5/2021 |
| KR | 10-2021-0125911 A | 10/2021 |
| KR | 10-2022-0032861 A | 3/2022 |
| KR | 10-2022-0047850 A | 4/2022 |
| KR | 10-2022-0061835 A | 5/2022 |

OTHER PUBLICATIONS

"Notice of Submission of Opinions" Office Action issued in KR 10-2022-0172462; mailed by the Korean Intellectual Property Office on Sep. 21, 2024.

"Written Decision on Registration" Office Action issued in KR 10-2022-0172462; mailed by the Korean Intellectual Property Office on Mar. 7, 2025.

* cited by examiner

FIG. 4

S510 — Enter input data

S520 — Enter IP scenario

S530 — Operation of entire SoC

S540 — Identify computational processing speed and bottleneck portion

S550 — Optimize bottleneck

Bottleneck is eliminated?
No
Yes

S560 — Check computation speed based on verification scenario

Computation speed based on scenario is satisfied?
No
Yes

S570 — Terminate optimization

NEURAL NETWORK OPTIMIZATION DEVICE FOR EDGE DEVICE MEETING ON-DEMAND INSTRUCTION AND METHOD USING THE SAME

CROSS-REFERENCE TO RELATED APPLICATIONS

The present application is a continuation of International Patent Application No. PCT/KR2022/021348, filed on Dec. 27, 2022, which is based upon and claims the benefit of priority to Korean Patent Application No. 10-2022-0172462 filed on Dec. 12, 2022. The disclosures of the above-listed applications are hereby incorporated by reference herein in their entirety.

BACKGROUND

Embodiments of the present disclosure described herein relate to a device for configuring and optimizing a neural network that meets a condition according to a request of a customer ordering an edge device and a method thereof, and more particularly, relate to a neural network optimization device for an edge device that meets a customer-requested instruction and a method using the same.

A processor that processes computations of a neural network is called a neural processing unit (NPU) and performs computations with a functional block that performs an individual function to perform the computations. After processing the computations, the NPU stores data in a buffer and then delivers the data to DRAM.

The process of the computations processed by the NPU is determined by various algorithms such as complexity, the number of channels, necessary memories, data bandwidths, whether memory interleaving is utilized, pipelines, and the like. Nowadays, the design of the NPU and the design of the algorithm for computational processing of the neural network are done manually. Accordingly, it takes a considerable amount of time to configure customized devices according to requests of customers.

SUMMARY

Embodiments of the present disclosure provide a design according to manual adjustment as in the existing NPU design.

Embodiments of the present disclosure provide performing a design in a method of automatically adjusting basic resources of NPU so as to correspond to instructions according to a customer's needs. In this process, adjusting individual resources refers to processing neural network computations by predicting performance according to the adjustment and applying basic input values again.

Problems to be solved by the present disclosure are not limited to the problems mentioned above, and other problems not mentioned will be clearly understood by those skilled in the art from the following description.

According to an embodiment, a neural network optimizing method performed by a device includes performing a computation on an input value with a basic resource of a first neural network based on a customer-requested instruction for the basic resource used for computation execution of the first neural network, checking computational performance including a computational processing speed, a power consumption amount, and a chip area according to the computation execution of the first neural network, adjusting at least one of the basic resource based on the checked computational performance, re-performing the computation on the input value based on the customer-requested instruction with a resource of the second neural network after changing to an environment of a second neural network by adjusting the at least one of the basic resource, and outputting the second neural network as a final neural network when computational performance according to re-performing a computation of the second neural network minimizes consumption of a resource.

Besides, a computer program stored in a computer-readable recording medium for execution to implement the present disclosure may be further provided.

In addition, a computer-readable recording medium for recording a computer program for performing the method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a schematic block diagram of a SoC optimization device based on an IP scenario, according to various embodiments of the present disclosure.

DETAILED DESCRIPTION

Figure 1:
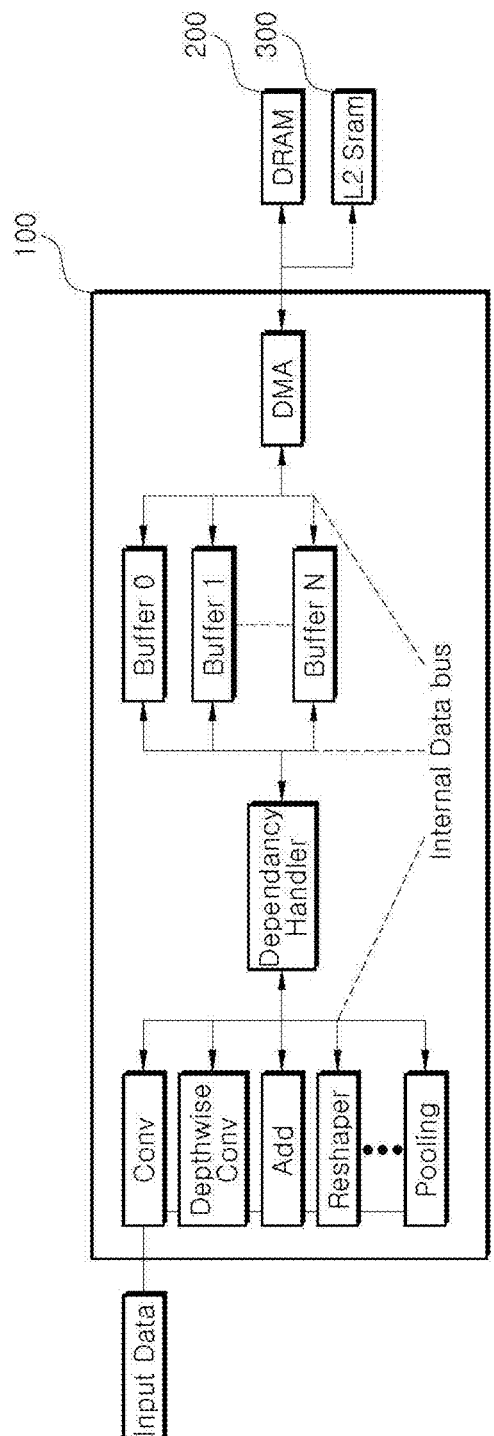
FIG. 1 is a schematic block diagram of a neural network algorithm optimization device based on individual instructions, according to various embodiments of the present disclosure.

The same reference numerals denote the same elements throughout the present disclosure. The present disclosure does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

In this specification, an 'apparatus according to an embodiment of the present disclosure' includes all various devices capable of providing results to a user by performing arithmetic processing. For example, the apparatus according to an embodiment of the present disclosure may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

NPU according to various embodiments of the present disclosure performs various computations through resources to perform neural network operations. After performing the computations, the NPU stores data in a buffer memory and then delivers the data to DRAM.

Basic resources for performing neural network operations according to various embodiments of the present disclosure consist of a type of functional block. For example, the functional block may include a convolution block, a depthwise convolution block, an addition operation block, a reshaper block, a pooling block, or the like.

Instructions according to various embodiments of the present disclosure may be instructions that meet a customer's needs for producing an edge NPU. For example, the instructions include instructions that meet the purpose that the customer wants to be applied through the edge NPU. The instructions in the present disclosure are described as "customer-requested instructions". Neural network optimization in the present disclosure refers to optimization for preventing unnecessary waste of resources when computations are performed based on the customer-requested instructions.

The performance according to various embodiments of the present disclosure may be used to describe aspects such as processing time, power consumption, computation amounts, memory bandwidth usage, and memory usage according to the computation performance of the neural network when an application is executed or implemented on the hardware of a mobile device. Predicting the performance may mean predicted values for processing time, power consumption, computation amounts, memory bandwidth usage, and memory usage according to the computation performance of the neural network.

The neural network optimization according to various embodiments of the present disclosure may predict the performance of a neural network in consideration of an operating time on a hardware side or computation time, latency, or the like on a software side.

FIG. 1 is a schematic block diagram of a neural network algorithm optimization device based on individual instructions, according to various embodiments of the present disclosure.

Referring to FIG. 1, the neural network algorithm optimization includes a process of minimizing the latency of data exchange between a NPU 100, a DRAM 200, and a L2 SRAM 300.

According to various embodiments, deep learning is a field of artificial intelligence and includes a machine learning method capable of realizing functions similar to human learning ability in a computing device. A deep learning network may be a network based on an artificial neural network. For example, the deep learning network may consist of an input layer, a hidden layer, and an output layer. The hidden layer may consist of one or more layers. The input layer is a layer where data is initially input; the hidden layer is a layer where data is hidden; and the output layer is a layer where trained data is output. The deep learning network may have a structure in which a plurality of layers that perform specific computations are stacked.

The deep learning network according to an embodiment may include at least one of a deep neural network (DNN), a convolution neural network (CNN), a recurrent neural network, an auto encoder, a generative adversarial network, an adversarial network (GAN) or a deep belief network (DBN). The deep learning network may be applied to various deep learning networks including a plurality of layers.

The NPU 100 according to an embodiment may be a neural network processing unit, and may refer to a processor specialized to compute an artificial neural network model separately from CPU. The artificial neural network refers to a network that may multiply and add individual weights depending on several input values, and may additionally transform and deliver a value, which is obtained by adding a deviation, by using an activation function. The trained artificial neural network may output inference results from input values.

The NPU 100 according to an embodiment may include a semiconductor implemented with an electronic circuit. The electronic circuit refers to a circuit including, for example, transistors, capacitors, and the like. The NPU 100 may include an internal memory, a scheduler, and an interface.

According to an embodiment, the NPU 100 may read data stored in the DRAM 200 and/or the L2 SRAM 300 into the internal memory through an NPU interface. The NPU scheduler may control computations of a processing element array for inference operations of the NPU 100 and the reading and/or writing order of the internal memory.

The computational processing speed of the NPU 100 according to an embodiment may be changed by the processing speed of resources constituting the NPU 100. In other words, the processing speed of the NPU 100 may be adjusted by adjusting resources constituting the NPU 100 such that the processing speed of the resources is adjusted.

Figure 2:
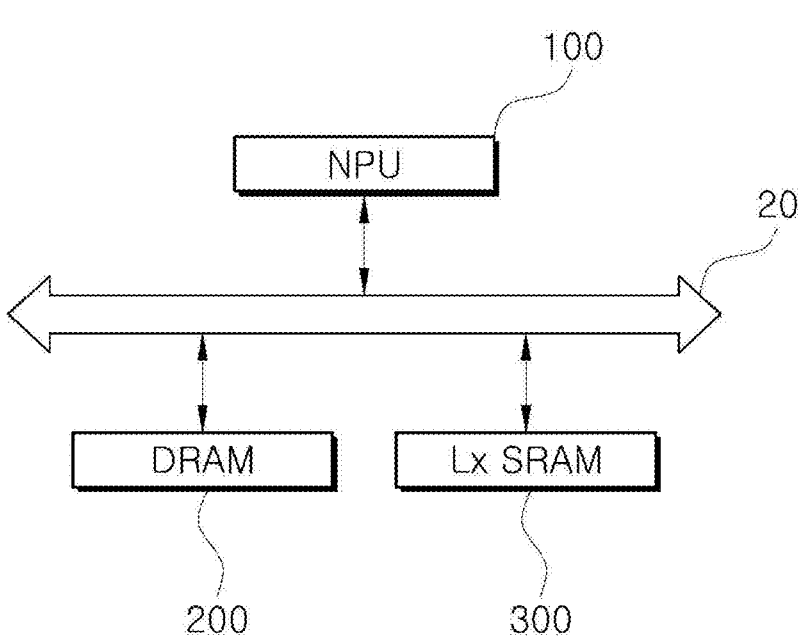
FIG. 2 is a block diagram for describing a neural network optimization device, according to various embodiments of the present disclosure.

FIG. 2 is a block diagram for describing a neural network optimization device, according to various embodiments of the present disclosure.

Referring to FIG. 2, a neural network optimization device according to an embodiment of the present disclosure may include the NPU 100, the DRAM 200, and the L2 SRAM 300. Each node may be electrically connected to each other through a bus 20. The configurations shown in FIG. 2 are only examples and may be replaced or added.

The neural network optimization device according to an embodiment may be implemented as a mobile device with resources, but is not limited thereto. The neural network optimization device may include a CPU and the NPU 100 for neural network optimization. Here, the CPU may execute various programs or applications that drive the neural network optimization device and may control other components. The NPU 100 may be dedicated to programs or applications that include neural network computations or may process computations in cooperation with the CPU.

The neural network optimization device according to an embodiment may perform optimization through individual functional blocks in a procedure of processing computations by the CPU and the NPU 100. For example, to optimize the neural network, the neural network optimization device may perform optimization of the neural network through a computation execution block, a computation performance check block, a resource adjustment block, an optimization execution block, and the like.

To optimize the neural network for computational processing required by each customer, the neural network optimization device according to an embodiment may perform computations of a neural network based on instructions for reflecting the needs of each customer. The neural network optimization device may check a computational processing speed based on individual instructions through the NPU 100, the DRAM 200, and the L2 SRAM 300 and may adjust resources depending on the computational processing speed.

The neural network optimization device according to an embodiment may optimize the neural network to increase neural network computing efficiency. For example, an optimization functional block of the neural network optimization device performs a task of changing the existing neural network into optimized resources according to instructions by using the computational processing speed and the prediction performance corresponding to the computational processing speed according to resources used to perform computations of the neural network.

According to an embodiment, the neural network optimization device may check computational performance including computational processing speed, power consumption amount, and chip area according to the computational performance. Here, the computational performance identified by the neural network optimization device is not limited thereto.

The neural network optimization device according to an embodiment may determine a neural network, in which basic resources are changed at least partially as, a second neural network by using a neural network composed of basic resources as a first neural network. For example, the second neural network may be a neural network that maximizes computational performance by minimizing resource consumption when performing computations of the neural network based on customer-requested instructions. In this case, the neural network optimization device may output the second neural network as a final neural network.

An interface unit serves as a conduit for various types of external devices connected to the neural network optimization device 10. The interface unit may include at least one of a wired/wireless headset port, an external charger port, a wired/wireless data port, a memory card port, a port for connecting a device equipped with a subscriber identification module (SIM), an audio input/output (I/O) port, a video I/O port, and an earphone port.

A control unit may include a CPU and/or the NPU 100, and may be implemented with a memory that stores data regarding an algorithm for controlling operations of components within the neural network optimization device 10, or a program for implementing the algorithm, and at least one processor that performs the above-described operations by using the data stored in the memory. At this time, the memory and the processor may be implemented as separate chips. Alternatively, the memory and the processor may be implemented as a single chip.

Furthermore, the control unit may control one of the components described above or the combination of the components to implement various embodiments of the present disclosure described below with reference to FIGS. 3 to 5 on the neural network optimization device 10.

At least one component may be added or deleted to correspond to the performance of the components illustrated in FIG. 2. Furthermore, it will be easily understood by those skilled in the art that mutual locations of the components may be changed to correspond to the performance or structure of the system.

In the meantime, each component shown in FIG. 2 refers to software components and/or hardware components such as field programmable gate array (FPGA) and application specific integrated circuit (ASIC).

Figure 3:
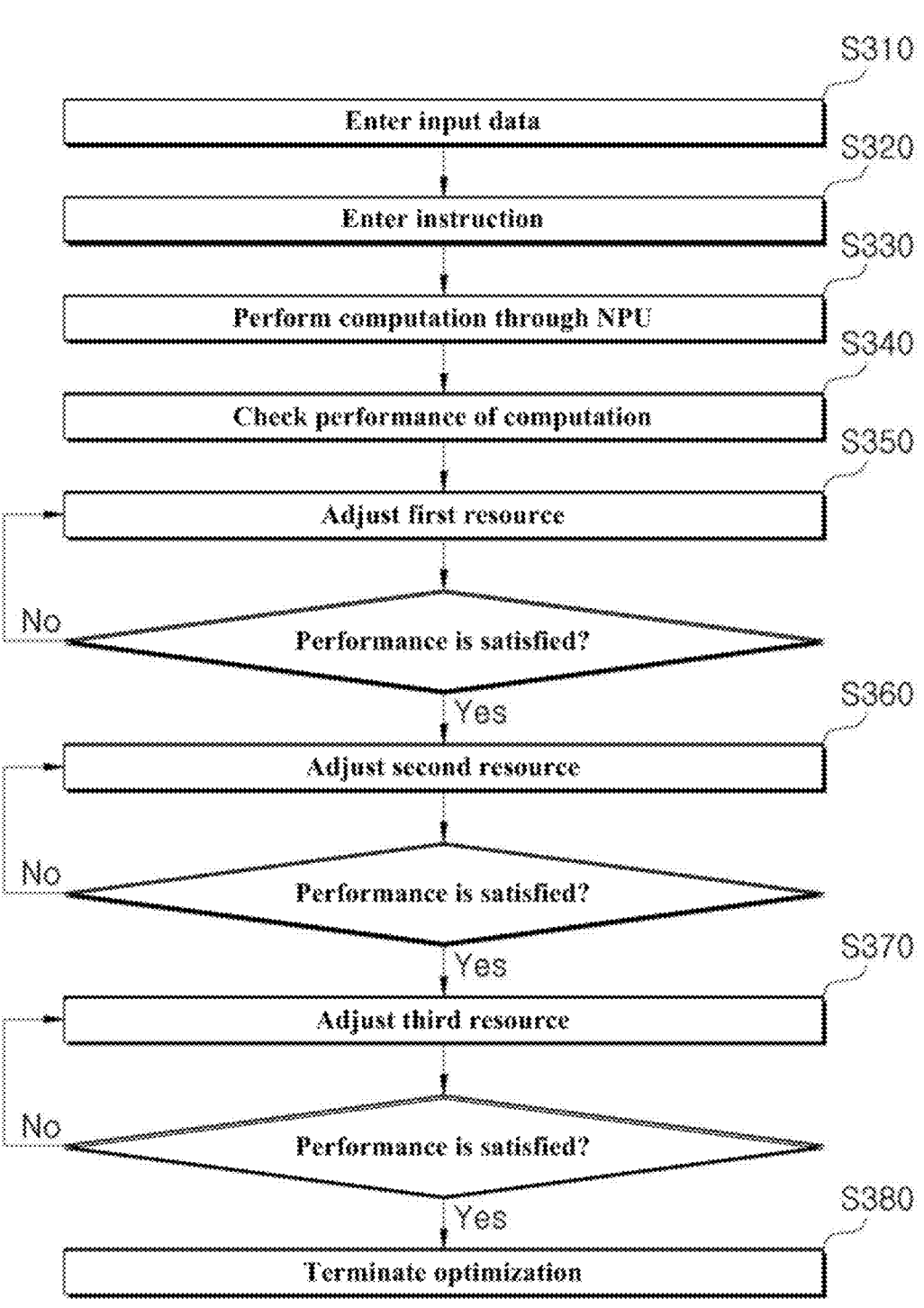
FIG. 3 is a flowchart of a neural network optimizing method based on individual instructions, according to various embodiments of the present disclosure.

FIG. 3 is a flowchart of a neural network optimizing method based on individual instructions, according to various embodiments of the present disclosure.

Referring to FIG. 3, a neural network optimization device (e.g., the neural network optimization device in FIG. 2) may design an NPU in a form optimized for a specific algorithm required by a customer. The specific algorithm required by the customer may refer to a customer-requested instruction. The neural network optimization device performs computations based on instructions and optimizes a chip in a form suitable therefor.

According to an embodiment, the neural network optimization device may receive an arbitrary input value (S310). The arbitrary input value may be input data and may be read through an interface of an NPU (e.g., the NPU 100 in FIG. 2).

The neural network optimization device according to an embodiment may check an individual customer-requested instruction (S320). The customer-requested instruction refers to an instruction for generating a neural network that meets the customer's request.

The neural network optimization device according to an embodiment may perform computations on the input value based on the customer-requested instructions for a basic resource through the NPU (S330). For example, the neural network optimization device may perform computations on the input value based on the customer-requested instruction through a first neural network composed of a basic resource.

The neural network optimization device according to an embodiment may check the performance of computational execution based on the customer-requested instruction of the first neural network through the NPU (S340). For example, after performing the computations through the NPU, the neural network optimization device may check the computational performance of the first neural network by using a computation performance check block. For example, the neural network optimization device may check the computational performance including the computational processing speed, power consumption amount, and chip area of a neural network.

The neural network optimization device according to an embodiment may predict performance after adjusting resources of the neural network. For example, the neural network optimization device identifies prediction performance, which obtained by predicting the performance according to the computational execution of the neural network based on a condition for resources used to perform the computations of the neural network. For example, the neural network optimization device may determine whether the performance of the computational execution of the neural network corresponds to an output suitable for the instruction, based on a condition for a memory bandwidth. When the prediction performance deviates from the output suitable for the instruction, it may be determined that optimization is necessary by adjusting the corresponding resource.

The neural network optimization device according to an embodiment may adjust at least one of the basic resource constituting the first neural network. The neural network device may adjust the first resource among the basic resource (S350). Here, the neural network optimization device may adjust a resource constituting the neural network through a resource adjustment block. For example, the neural network optimization device may adjust the number of channels and internal memory capacity. For another example, the neural network optimization device may adjust the resource depending on an instruction that reflects the complexity of the series of processes, interleaving on/off, and whether an NoC switch architecture is adopted.

When receiving the customer-requested instruction, the neural network optimization device according to an embodiment may determine the level of performance in the case where the customer-requested instruction is input into a resource having the greatest size based on the instruction. For example, the neural network optimization device may iterate the operation such that the computational performance of the neural network is capable of being optimized for each individual instruction. The neural network optimization device may adjust the individual resource constituting the neural network so as to change the number of channels or to adjust another function without degrading the computational processing performance of the neural network.

After S350, the neural network optimization device according to an embodiment may determine whether the performance according to the customer-requested instruction is satisfied. After adjusting the individual configuration, the neural network optimization device may determine whether the performance requested by the customer is satisfied, at each step. For example, after adjusting configurations of S350, S360, and S370, the neural network optimization device determines whether the performance according to the adjustment is satisfied, through a computation performance check block.

The neural network optimization device according to an embodiment may adjust at least one of the basic resource constituting the first neural network. The neural network device may adjust a second resource among basic resources (S360). Here, the neural network optimization device may adjust the resource constituting the neural network through the resource adjustment block. For example, the neural network optimization device may adjust a data bandwidth and a pipeline.

The neural network optimization device according to an embodiment may adjust at least one of the basic resource constituting the first neural network. The neural network device may adjust a third resource among basic resources (S370). Here, the neural network optimization device may adjust the resource constituting the neural network through the resource adjustment block. For example, the neural network optimization device may perform adjustments to add or remove a resource for performing an additional function requested by the customer.

The neural network optimization device according to an embodiment adjusts at least one of the first resource, the second resource, and the third resource or at least one of the basic resource so as to be suitable for the instruction. The neural network optimization device may optimize the neural network as a second neural network by adjusting the resources of the first neural network through an optimization execution block (S380). When terminating the neural network optimization based on instructions, the neural network optimization device may output the second neural network as the final neural network. According to this process, the neural network optimization device may generate the neural network suitable for the individual instruction.

The neural network optimization device according to an embodiment may determine a layer, in which the performance of the first neural network deviates from the customer-requested instruction, as a portion requiring adjustment. The customer-requested instruction includes an individual instruction to be executed by the final neural network. The neural network optimization device may determine the first resource, the second resource, the third resource, or the like corresponding to the portion, which needs to be adjusted in the first neural network, based on the instruction and may determine the resource to be adjusted adaptively depending on the individual instruction.

The neural network optimization device according to an embodiment generates an optimal neural network for performing an algorithm based on an instruction that reflects characteristics different for respective individual architecture. For example, the neural network optimization device performs optimization such as reducing an addition operation block in algorithm A that reflects instructions A, or reducing a pooling block in algorithm B that reflects instructions B.

Figure 4:
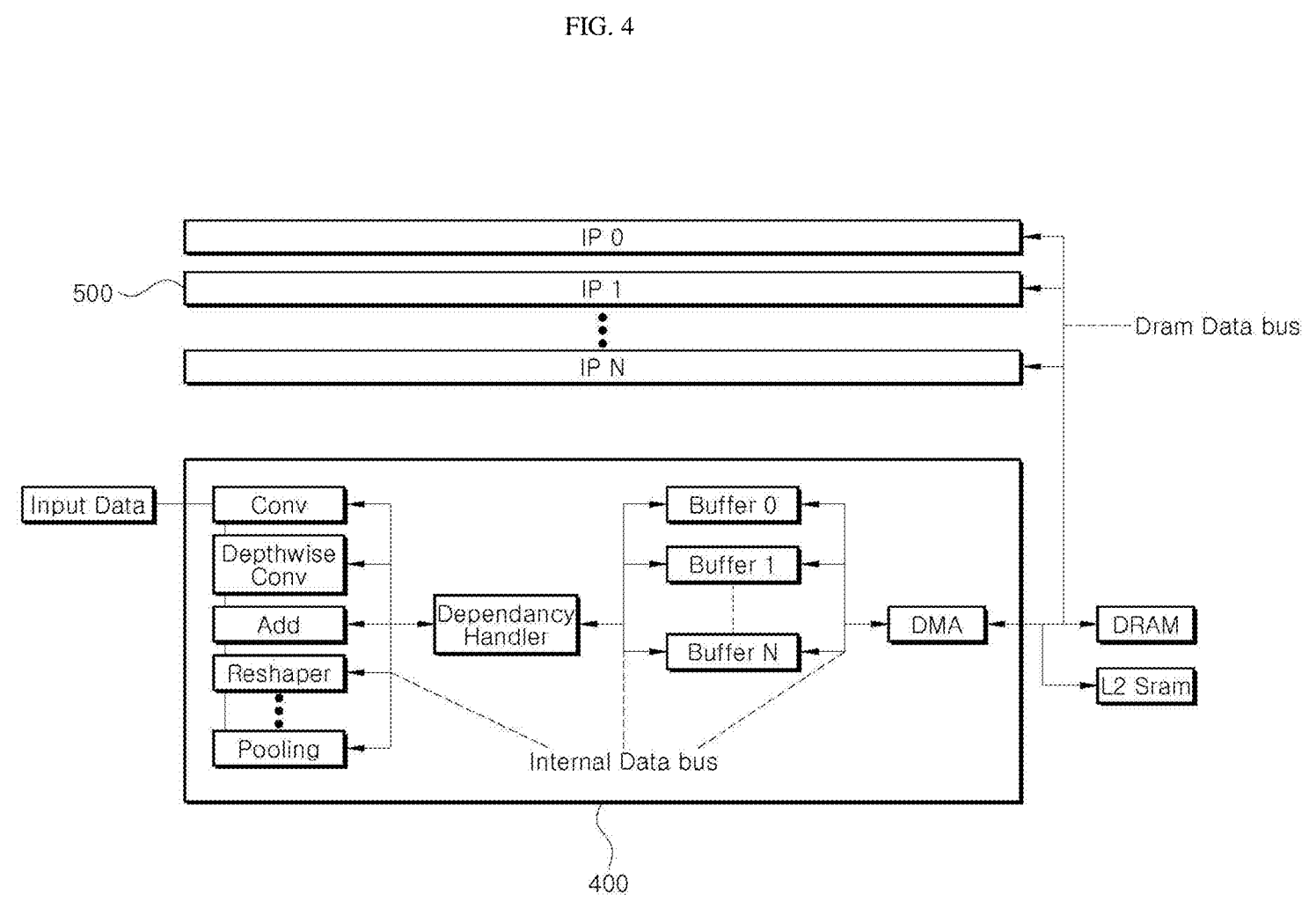

FIG. 4 is a schematic block diagram of a SoC optimization device based on an IP scenario, according to various embodiments of the present disclosure.

Referring to FIG. 4, neural network algorithm optimization includes a process of minimizing the latency of data exchange between a NPU 400 and a DRAM, a L2 SRAM, and an IP 500.

The NPU 400 according to an embodiment may be a neural network processing unit, and may refer to a processor specialized to compute an artificial neural network model separately from CPU. The NPU 400 may include an internal memory, a scheduler, and an interface.

According to an embodiment, the NPU 400 may read data stored in the DRAM and/or the L2 SRAM into the internal memory through an NPU interface. The NPU scheduler may control computations of a processing element array for inference operations of the NPU 400 and the reading and/or writing order of the internal memory.

The computational processing speed of the NPU 400 according to an embodiment may be changed by the processing speed of resources constituting the NPU 400. In other words, the processing speed of the NPU 400 may be adjusted by adjusting resources constituting the NPU 400 such that the processing speed of the resources is adjusted.

A SoC according to an embodiment may be implemented with the NPU 400, a memory, and the IP 500 in a single chip. The neural network optimization device identifies a point in time when each operation is terminated by a dependency handler such that a series of processes processed through the NPU 400 may be completed as quickly as possible. In the process, the neural network optimization device may schedule a buffer to be used. In the series of processes, the speed may be sensitively determined depending on a DRAM data width, a bus frequency, a bus structure, and whether L2 SRAM is used.

The IP 500 according to an embodiment may include a CPU, an APU, or the like. The SoC is designed based on the detailed characteristics of each chip of an IP. The neural network optimization device optimizes data lines of the NPU 400 and L2 SRAM based on a time point, at which IPs communicate with the DRAM, and a used bandwidth. In detail, the neural network device allows the NPU 400 to operate by determining data characteristics on a data bus output by the IP.

According to an embodiment, the IP 500 may mean a functional block capable of being reused in system IC design. This refers to a hardware or software functional block. The reusable hardware functional block may be referred to as "hardware IP". The reusable software functional blocks may be referred to as "software IP". For example, a functional block such as a processor, RAM, and ROM correspond to the hardware IP. The IP 500 according to an embodiment of the present disclosure may mean the hardware IP. The hardware IP may include a soft IP, a firm IP, and a hard IP.

According to an embodiment, according to various scenarios in which in addition to the NPU 400 various IPs 500 exchange data with the DRAM, a DRAM data bus bottleneck may occur in the SoC, or it may be difficult to achieve sufficient speed in the SoC. To automatically optimize these various hardware elements, the neural network optimization device determines the hardware elements based on input values and various scenarios of the IP 500s.

The IP 500 according to an embodiment may cause a bottleneck in a process of exchanging data with the DRAM. The neural network optimization device identifies a bottleneck based on IP scenarios and optimizes the neural network by adjusting a portion that eliminates the bottleneck. Accordingly, the computational processing speed of the SoC is optimized.

The neural network optimization device according to an embodiment may determine whether the bottleneck is eliminated, based on whether the individual resource is initially used based on the heaviest IP scenario. After performing the adjustment for eliminating the bottleneck, the neural network optimization device may check the computation speed based on a verification scenario. Here, the verification scenario may be a scenario for determining whether a mobile rate, Rez rate, and Yolo speed are proper.

For example, a portion, in which the bottleneck according to an embodiment occurs, may correspond to an intermediate branch point between the NPU 400, the DRAM, and the IP 500. The neural network optimization device may optimize data processing speed at a branch point. For example, the neural network optimization device may mainly adjust a path between a data line and a buffer. When the L2 cache is turned on, data needs to be directly delivered from the DARM to the buffer, but it may be received through a request required by the IP 500 in the middle between the DARM and the buffer. Accordingly, the data may be stored in advance in an L2 cache and a necessary response may be sent from the cache. A process of processing the request and the response may be performed by the neural network optimization device.

Figure 5:
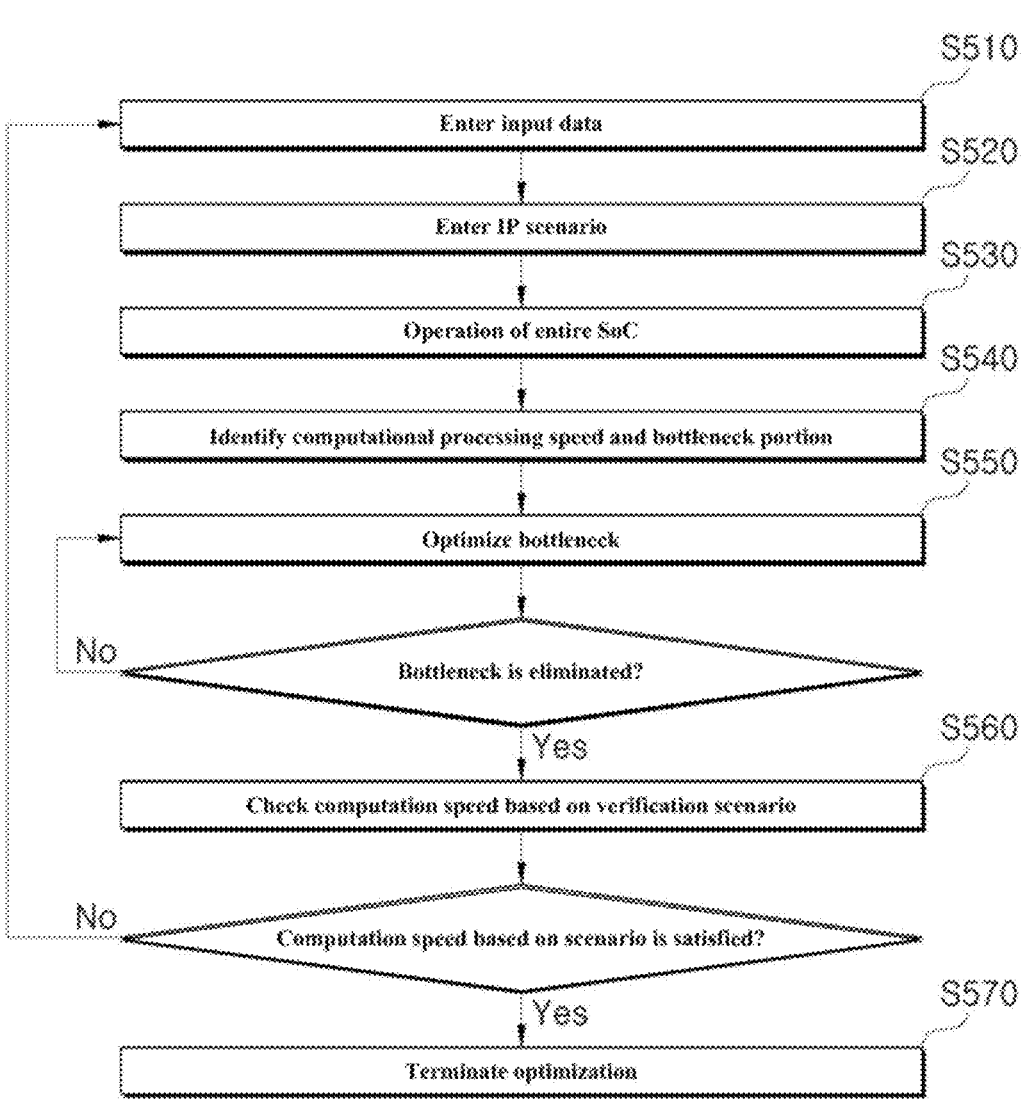
FIG. 5 is a flowchart of a SoC optimizing method based on an IP scenario, according to various embodiments of the present disclosure.

FIG. 5 is a flowchart of a SoC optimizing method based on an IP scenario, according to various embodiments of the present disclosure.

Referring to FIG. 5, a neural network optimization device (e.g., the neural network optimization device in FIG. 2) may design an SoC in a form optimized for a specific scenario requested by an IP (e.g., the IP 500 in FIG. 4). The specific scenario may refer to a hardware scenario. The neural network optimization device performs computations based on the hardware scenario and optimizes the SoC in a form suitable therefor.

According to an embodiment, the neural network optimization device may receive an arbitrary input value (S510). The arbitrary input value may be input data and may be read through an interface of an NPU (e.g., the NPU 400 in FIG. 4).

The neural network optimization device according to an embodiment may check an individual IP scenario (S520). The IP scenario refers to a hardware scenario for generating the SoC that meets a request required by an individual IP.

The neural network optimization device according to an embodiment may perform computations on an input value based on the IP scenario for a configuration of the SoC through the entire SoC (S530). For example, the neural network optimization device may perform computations on the input value based on the IP scenario through a first SOC including a first neural network composed of basic resources and the individual IP.

The neural network optimization device according to an embodiment may identify the performance of computational execution based on the IP scenario of the first neural network through the first SoC (S540). For example, after performing the computations through the first SoC, the neural network optimization device may check the computational performance of the first neural network by using a computation performance check block. For example, the neural network optimization device may check the computational performance of the first SoC including the computational processing speed, power consumption amount, chip area, and bottleneck portion of a neural network.

The neural network optimization device according to an embodiment may minimize a bottleneck (S550). Here, the neural network optimization device may adjust at least one of SoC configurations. In this way, the bottleneck may be eliminated and minimized. For example, the neural network optimization device may adjust at least one of a DRAM bandwidth, a bus frequency, a bus structure, and the number of L2 SRAMs.

When receiving the IP scenario, the neural network optimization device according to an embodiment may determine the level of performance in the case where the IP scenario is input into a resource having the greatest size based on the IP scenario. For example, the neural network optimization device may iterate the operation to minimize the bottleneck of the neural network for each IP scenario.

After S550, the neural network optimization device according to an embodiment may adjust the configuration of the SoC to minimize the bottleneck of the SoC according to the individual IP. After adjusting the configuration of the SoC, the neural network optimization device may check the computation speed based on the verification scenario for determining whether the performance of the SoC according to IP satisfies the computation speed based on the scenario (S560).

The neural network optimization device according to an embodiment may check the computation speed of the neural network based on the verification scenario. When the computation speed reaches a target value, the neural network optimization device according to an embodiment may terminate the neural network optimization based on the IP scenario (S570).

The neural network optimization device according to an embodiment may change the first neural network to the second neural network by adjusting at least one of the configurations of the SoC, thereby optimizing the computational processing speed of the SoC. Accordingly, the neural network optimization device may optimize the configuration of the entire SoC so as to be suitable for requirements of IP by minimizing the bottleneck of the SoC.

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the present disclosure belongs will understand that the present disclosure may be practiced in forms other than the disclosed embodiments without altering the technical ideas or essential features of the present disclosure. The disclosed embodiments are examples and should not be construed as limited thereto.

According to the above-mentioned problem solving means of the present disclosure, an optimal neural network may be output by automatically adjusting resources to design an NPU optimized for a specific algorithm that meets specifications desired by a customer requesting the design of an edge device.

Moreover, a neural network optimizing method may optimize operation processing based on customer-requested instructions and adjust individual resources to reduce bottlenecks in the overall operation processing of SoC based on a plurality of IP scenarios, thereby automatically manufacturing customized NPU and/or SoC.

Effects of the present disclosure are not limited to the effects mentioned above, and other effects not mentioned will be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:
1. A neural network optimizing method performed by a device, the method comprising:
performing, based on a customer-requested instruction for basic resources used for computation execution of a first neural network, a first computation on an input value with the basic resources, wherein the performing of the first computation comprises inputting the customer-requested instruction into a particular resource having a greatest size, among the basic resources;
identifying a bottleneck portion caused in a process of data exchange between data blocks of the first neural network, at an intermediate branch point between a data line and a buffer;
checking a first computational performance of the first computation, wherein the first computational performance includes a computational processing speed and a power consumption amount of the bottleneck portion;
adjusting, based on the checked computational performance and a customer-requested performance according to the customer-requested instruction, at least one resource of the basic resources, adjusting a data path of the bottleneck portion, and configuring a second neural network with the adjusted at least one resource and the adjusted data path;
performing a second computation on the input value with the adjusted at least one resource and the adjusted data path of the second neural network;
checking a second computational performance of the second computation; and
when the second computational performance of the second computation minimizes consumption of the adjusted at least one resource and latency of the adjusted data path, outputting the second neural network as a final neural network,
wherein the customer-requested instruction is an instruction for generating the final neural network that meets a customer's request,
wherein the adjusting of the at least one resource of the basic resources comprises:
adjusting a first resource among the basic resources, wherein the first resource is configured to adjust internal memory capacity and a number of channels;
determining whether the customer-requested performance is satisfied with the adjusted, first resource;
when the customer-requested performance is satisfied with the adjusted first resource, further adjusting a second resource among the basic resources, wherein the second resource is configured to adjust a pipeline and a data bandwidth;
determining whether the customer-requested performance is satisfied with the adjusted second resource; and
when the customer-requested performance is satisfied with the adjusted second resource, further adjusting a third resource among the basic resources, wherein the third resource is configured to perform an additional function of the customer's request, and
wherein the method performs all of the performing of the first computation, the identifying of the bottleneck portion, the checking of the first computational performance, the adjusting of the at least one resource, the adjusting of the data path, the configuring of the second neural network, the performing of the second computation, and the outputting of the second neural network, again, for a different customer-requested instruction.

2. A neural network optimization device comprising:
a computation execution block configured to perform, based on a customer-requested instruction for basic resources used for computation execution of a first neural network, a first computation on an input value with the basic resources, wherein the first computation is performed by inputting the customer-requested instruction into a particular resource having a greatest size, among the basic resources;
a computation performance check block configured to identify a bottleneck portion caused in a process of data exchange between data blocks of the first neural network, at an intermediate branch point between a data line and a buffer, and check a first computational performance of the first computation, wherein the first computational performance includes a computational processing speed and a power consumption amount of the bottleneck portion;
a resource adjustment block configured to adjust, based on the checked computational performance and a customer-requested performance according to the customer-requested instruction, at least one resource of the basic resources, adjust a data path of the bottleneck portion, and configure a second neural network with the adjusted at least one resource and the adjusted data path; and
an optimization execution block configured to perform a second computation on the input value with the adjusted at least one resource and the adjusted data path of the second neural network, check a second computational performance of the second computation, and output the second neural network as a final neural network when the second computational performance of the second computation minimizes consumption of the adjusted at least one resource and latency of the adjusted data path,
wherein the customer-requested instruction is an instruction for generating the final neural network that meets a customer's request,
wherein the resource adjustment block is configured to:
adjust a first resource among the basic resources, wherein the first resource is configured to adjust internal memory capacity and a number of channels,
determine whether the customer-requested performance is satisfied with the adjusted first resource;
when the customer-requested performance is satisfied with the adjusted first resource, further adjust a second resource among the basic resources, wherein the second resource is configured to adjust a pipeline and a data bandwidth;
determine whether the customer-requested performance is satisfied with the adjusted second resource; and
when the customer-requested performance is satisfied with the adjusted second resource, further adjust a third resource among the basic resources, wherein the third resource is configured to perform an additional function of the customer's request, and
wherein the neural network optimization device performs all of performing of the first computation, the identifying of the bottleneck portion, the checking of the first computational performance, the adjusting of the at least one resource, the adjusting of the data path, the configuring of the second neural network, the performing of the second computation, and the outputting of the second neural network, again, for a different customer-requested instruction.

3. A non-transitory computer-readable recording medium that stores a computer program which, when executed by one or more processors, performs following operations for performing a neural network optimizing method, the operations including:
performing, based on a customer-requested instruction for basic resources used for computation execution of a first neural network, a first computation on an input value with the basic resources, wherein the performing of the first computation comprises inputting the customer-requested instruction into a particular resource having a greatest size, among the basic resources;
identifying a bottleneck portion caused in a process of data exchange between data blocks of the first neural network, at an intermediate branch point between a data line and a buffer;
checking a first computational performance of the first computation, wherein the first computational performance includes a computational processing speed and a power consumption amount of the bottleneck portion;
adjusting, based on the checked computational performance and a customer-requested performance according to the customer-requested instruction, at least one resource of the basic resources, adjusting a data path of the bottleneck portion, and configuring a second neural network with the adjusted at least one resource and the adjusted data path;
performing a second computation on the input value with the adjusted at least one resource and the adjusted data path of the second neural network;
checking a second computational performance of the second computation; and
when the second computational performance of the second computation minimizes consumption of the adjusted at least one resource and latency of the adjusted data path, outputting the second neural network as a final neural network,
wherein the customer-requested instruction is an instruction for generating the final neural network that meets a customer's request,
wherein the adjusting of the at least one resource of the basic resources comprises:
adjusting a first resource among the basic resources, wherein the first resource is configured to adjust internal memory capacity and a number of channels;
determining whether the customer-requested performance is satisfied with the adjusted first resource;
when the customer-requested performance is satisfied with the adjusted first resource, further adjusting a second resource among the basic resources, wherein the second resource is configured to adjust a pipeline and a data bandwidth;
determining whether the customer-requested performance is satisfied with the adjusted second resource; and
when the customer-requested performance is satisfied with the adjusted second resource, further adjusting a third resource among the basic resources, wherein the third resource is configured to perform an additional function of the customer's request, and
wherein the method performs all of the performing of the first computation, the identifying of the bottleneck portion, the checking of the first computational performance, the adjusting of the at least one resource, the adjusting of the data path, the configuring of the second neural network, the performing of the second computation, and the outputting of the second neural network, again, for a different customer-requested instruction.

\* \* \* \* \*